United States Patent
Yang et al.

(10) Patent No.: US 10,241,671 B2
(45) Date of Patent: Mar. 26, 2019

(54) GESTURE RESPONSE METHOD AND DEVICE

(71) Applicant: Beijing Xiaomi Mobile Software Co., Ltd., Beijing (CN)

(72) Inventors: Kun Yang, Beijing (CN); Weixing Li, Beijing (CN); Chuanshun Ji, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 15/444,612

(22) Filed: Feb. 28, 2017

(65) Prior Publication Data

US 2017/0336962 A1 Nov. 23, 2017

(30) Foreign Application Priority Data

May 19, 2016 (CN) .......................... 2016 1 0338960

(51) Int. Cl.
  *G06F 3/044* (2006.01)
  *G06F 3/0488* (2013.01)
  *G06F 3/0485* (2013.01)

(52) U.S. Cl.
  CPC ........ *G06F 3/04883* (2013.01); *G06F 3/0485* (2013.01); *G06F 2203/0338* (2013.01)

(58) Field of Classification Search
  CPC ..... G06F 3/044; G06F 3/0488; G06F 3/04883

(Continued)

(56) References Cited

U.S. PATENT DOCUMENTS

| 2014/0075368 | A1 | 3/2014 | Kim et al. |
| 2014/0139471 | A1* | 5/2014 | Matsuki ............... G06F 3/0485 345/173 |

(Continued)

FOREIGN PATENT DOCUMENTS

| CN | 103064516 A | 4/2013 |
| CN | 104917891 A | 9/2016 |
| EP | 2879039 A1 | 6/2015 |

OTHER PUBLICATIONS

Extended European Search Report of European Patent Application No. 17153756.6, from the European Patent Office, dated Jul. 24, 2017.

(Continued)

*Primary Examiner* — Carolyn R Edwards
(74) *Attorney, Agent, or Firm* — Finnegan, Henderson, Farabow, Garrett & Dunner LLP (57) ABSTRACT

The present disclosure discloses a gesture response method and device. The gesture response method is performed by an apparatus including a touch sensing device, which further includes a touch sensor. The gesture response method includes: detecting a swipe event which corresponds to a finger swiping on the touch sensor before stopping at a contact point on the touch sensor; after the swipe event, detecting a time duration for which the finger stays at the contact point; when determining that the time duration reaches a preset time duration, determining a gesture-maintaining event has occurred; and after the gesture-maintaining event is determined and before the finger is detected to leave the contact point, repeatedly executing an operation corresponding to the swipe event at a preset time interval.

20 Claims, 10 Drawing Sheets

(58) Field of Classification Search
USPC .................................................. 345/156–184
See application file for complete search history.

(56) References Cited

U.S. PATENT DOCUMENTS

| 2014/0306899 | A1  | 10/2014 | Hicks |
|---|---|---|---|
| 2015/0061895 | A1* | 3/2015 | Ricci ....................... H04W 4/90 |
| | | | 340/902 |
| 2015/0074615 | A1* | 3/2015 | Han ................... G06K 9/00033 |
| | | | 715/863 |
| 2015/0154153 | A1  | 6/2015 | Fukayama |

OTHER PUBLICATIONS

International Search Report of PCT/CN2016/094341, mailed from the State Intellectual Property Office of China dated Feb. 6, 2017.

* cited by examiner

GESTURE RESPONSE METHOD AND DEVICE

CROSS-REFERENCE TO RELATED APPLICATIONS

The present disclosure is based upon and claims priority to Chinese Patent Application No. 201610338960.8, filed May 19, 2016, the entire contents of which are incorporated herein by reference.

TECHNICAL FIELD

The present disclosure generally relates to the field of touch control technology and, more particularly, to a gesture response method and device.

BACKGROUND

Currently, more and more devices are capable of recognizing and being controlled by gesture operations. Specifically, these devices may use a touch sensing module to capture a gesture performed by a user and obtain a movement trajectory of the gesture. For example, every time the touch sensing module senses a swiping operation and determines that the swiping operation meets a preset reporting condition, the touch sensing module may report a swipe gesture event. For example, to look up a contact list displayed by the smart device, a user may swipe on the touch sensor. Meanwhile, a computing module of the smart device scrolls the contact list by a preset number of rows each time it receives a report of a swipe gesture event from the touch sensing module. As such, the user is required to repeatedly swipe on the touch sensor in order to continuously scroll the contact list. Such repeated swiping can be tedious.

SUMMARY

According to a first aspect of the present disclosure, there is provided a gesture response method performed by an apparatus including a touch sensing device, wherein the touch sensing device further includes a touch sensor. The gesture response method comprises: detecting a swipe event which corresponds to a finger swiping on the touch sensor before stopping at a contact point on the touch sensor; after the swipe event, detecting a time duration for which the finger stays at the contact point; when determining that the time duration reaches a preset time duration, determining a gesture-maintaining event has occurred; and after the gesture-maintaining event is determined and before the finger is detected to leave the contact point, repeatedly executing an operation corresponding to the swipe event at a preset time interval.

According to a second aspect of the present disclosure, there is provided an apparatus, comprising: a touch sensing device including a touch sensor; and a controller coupled with the touch sensing device, the controller including: a processor; and a memory for storing instructions executable by the processor; wherein the touch sensing device is configured to: when detecting that a finger swipes on the touch sensor and then stays at a contact point on the touch sensor for a time duration equal to a preset time duration, report a gesture-maintaining event to the controller; and wherein the processor is configured to: after receiving the reporting of the gesture-maintaining event from the touch sensing device and before receiving from the touch sensing device a message indicating that the finger leaves the contact point, execute, at a preset time interval, an operation corresponding to a last swipe event reported by the touch sensing device, the last swipe event corresponding to the finger swiping on the touch sensor before stopping at the contact point.

According to a third aspect of the present disclosure, there is provided a non-transitory computer-readable storage medium comprising instructions that, when executed by a processor, cause the processor to perform a gesture response method. The method comprises: detecting a swipe event which corresponds to a finger swiping on a touch sensor before stopping at a contact point on the touch sensor; after the swipe event, detecting a time duration for which the finger stays at the contact point; when determining that the time duration reaches a preset time duration, determining a gesture-maintaining event has occurred; and after the gesture-maintaining event is determined and before the finger is detected to leave the contact point, repeatedly executing an operation corresponding to the swipe event at a preset time interval.

It is to be understood that the above general descriptions and detailed descriptions below are only exemplary and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the invention as recited in the appended claims.

Figure 1:
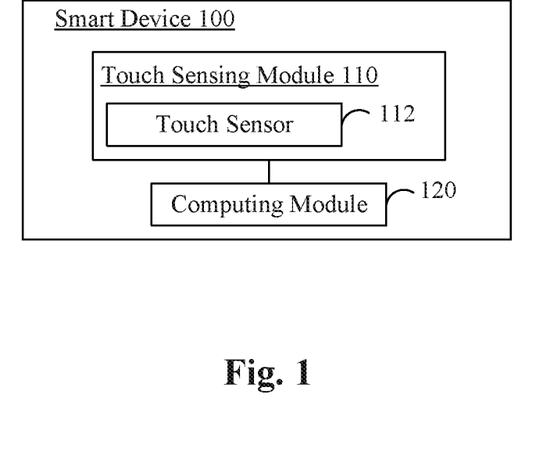
FIG. 1 is a block diagram of a smart device, according to an exemplary embodiment.

FIG. 1 is a block diagram of a smart device 100, according to an exemplary embodiment. For example, the smart device 100 may be a mobile phone, a computer, a digital broadcast terminal, a messaging device, a gaming console, a tablet, a medical device, exercise equipment, or a Personal Digital Assistant (PDA). As shown in FIG. 1, the smart device 100 includes a touch sensing module 110 and a computing module 120. The touch sensing module 110 is communicatively connected with the computing module 120. The "connection" between the touch sensing module 110 and the computing module 120 is a wired or a wireless connection that provides an information transmission path between two units, modules, or chips.

The touch sensing module 110 includes a touch sensor 112, which a user touches to perform touch-based operations on the smart device 100. In some embodiments, the touch sensor 112 is configured to sense and/or acquire a user's fingerprint present on a touch sensing area of the touch sensor 112.

The touch sensor 112 may be implemented as various hardware configurations. For example, the touch sensor 112 may be a touch screen with a touch sensing function, a combination of a touch screen and a touch sensor arranged under the touch screen, and/or a fingerprint acquirer located on the back of a mobile phone.

The touch sensor 112 is configured to determine whether the touch sensor 112 is touched by the user's finger. In some embodiments, the touch sensing module 110 further includes a computer chip for analyzing data generated by the touch sensor. In one embodiment, when the finger of the user touches the touch sensor 112, the touch sensor 112 acquires a fingerprint of the finger and a position on the touch sensor 112 where the fingerprint is generated, and sends the acquired fingerprint and position to the computer chip. The computer chip then determines whether the touch sensor 112 is touched by the finger and, if the touch sensor 112 is touched, a movement trajectory of the finger, according to the acquired fingerprint and position. In another embodiment, the touch sensor 112 senses changes of signals at some positions on the touch sensor 112, and sends the sensed signal changes and the associated positions to the computer chip. The computer chip then determines whether the touch sensor 112 is touched by the finger and, if the touch sensor 112 is touched, a movement trajectory of the finger, according to the signal changes and the associated positions.

The computing module 120 may be a part or the whole of a controller of the smart device 100. For example, the computing module 120 may be a specialized controller dedicated to responding to a gesture. Alternatively, the computing module 120 can be a general-purpose controller, e.g., a central processing unit of the smart device 100, which also controls functions unrelated to responding to a gesture. In some embodiments, the computing module 120 controls an application running in the smart device 100. The application can be controlled by gesture-based commands.

Figure 2:
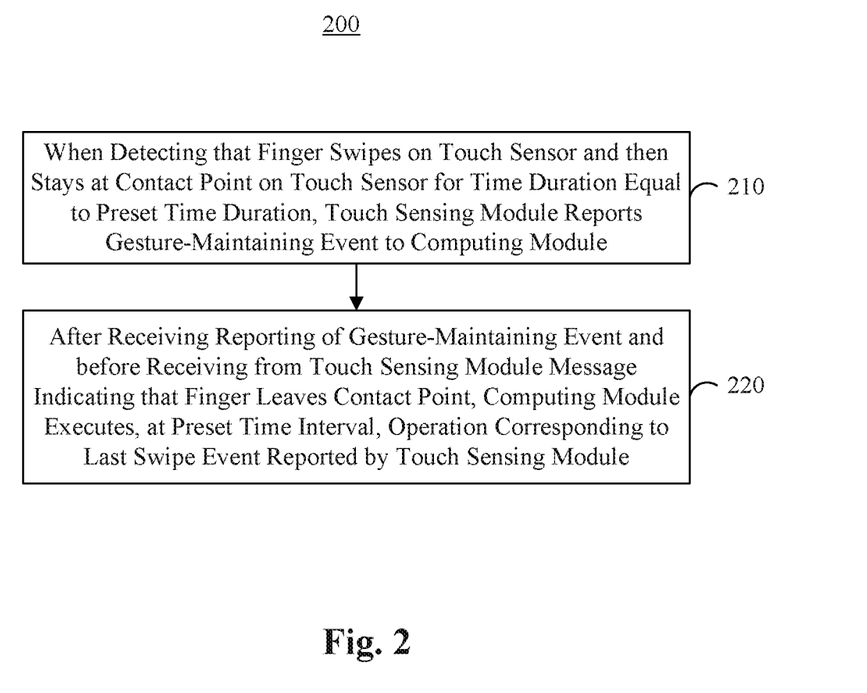
FIG. 2 is a flowchart of a gesture response method, according to an exemplary embodiment.

FIG. 2 is a flowchart of a gesture response method 200, according to an exemplary embodiment. For example, the method 200 is performed by the smart device 100 (FIG. 1). Referring to FIG. 2, the method 200 includes the following steps.

In step 210, when detecting that a finger swipes on the touch sensor 112 and then stays at a contact point on the touch sensor 112 for a time duration equal to a preset time duration, the touch sensing module 110 reports a gesture-maintaining event to the computing module 120. Here, the time duration for which the finger stays at the contact point refers to a time duration for which the finger touches the contact point.

In step 220, after receiving the reporting of the gesture-maintaining event and before receiving from the touch sensing module 110 a message indicating that the finger leaves the contact point, the computing module 120 executes, at a preset time interval, an operation corresponding to a last swipe event reported by the touch sensing module 110. A swipe event corresponds to a finger swiping on the touch sensor 112 before stopping at a contact point.

In the method 200, the computing module 120 can continuously and repeatedly execute the operation corresponding to the last reported swipe event, when the finger stays at the contact point. As such, the method 200 saves a user from the tedious repetition of swiping a finger on the touch sensor 112 when the user desires to continuously scroll contents displayed on the smart device 100. Accordingly, the method 200 can simplify the swipe operation.

Figure 3A:
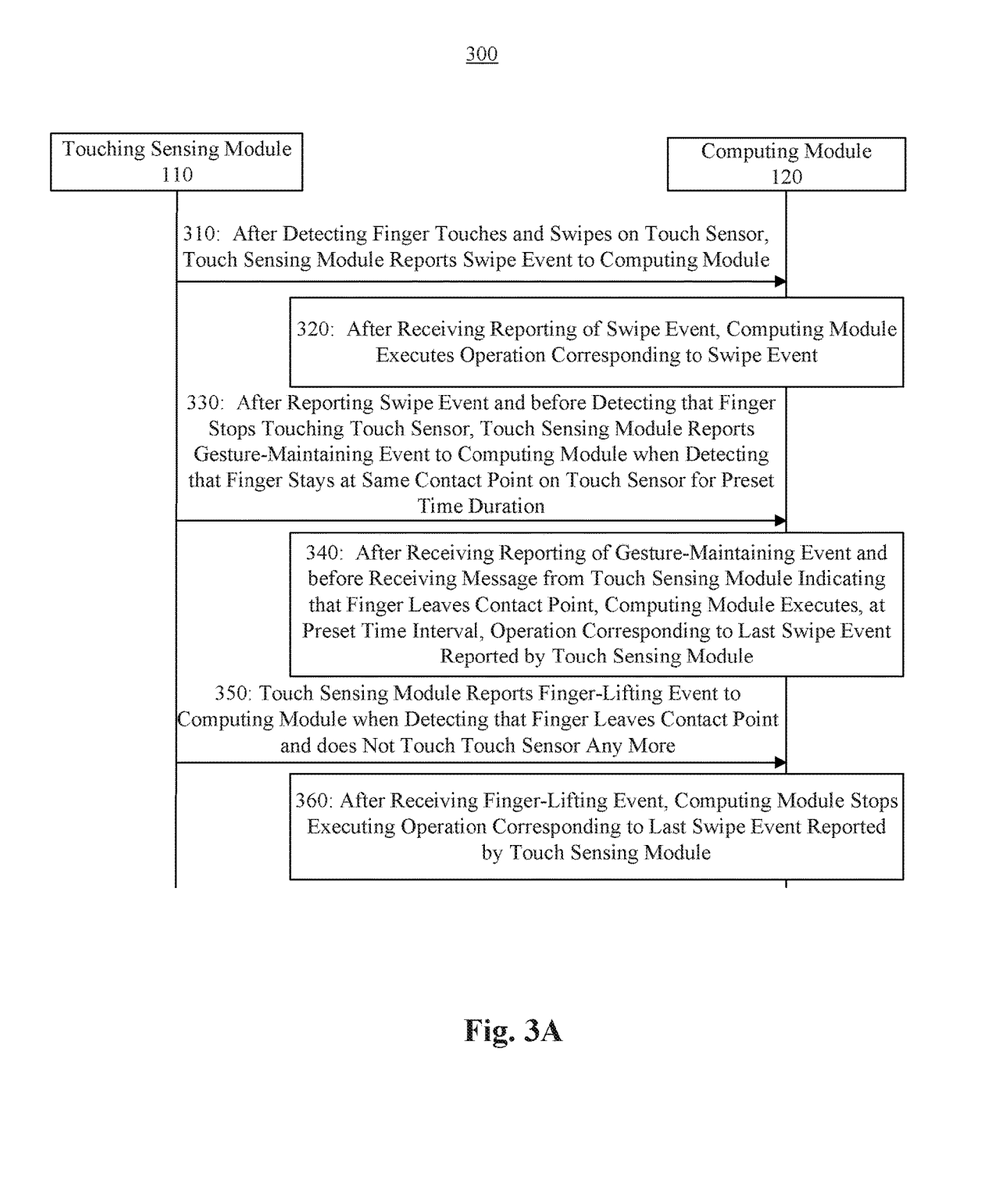
FIG. 3A is a flowchart of a gesture response method, according to an exemplary embodiment.

FIG. 3A is a flowchart of a method 300 for responding to a gesture command, according to an exemplary embodiment. Referring to FIG. 3A, the method 300 is performed by smart device 100 and includes the following steps.

In step 310, after detecting a finger touches and swipes on the touch sensor 112, the touch sensing module 110 reports a swipe event to the computing module 120.

In the disclosed embodiments, the touch sensing module 110 is configured to detect whether the finger touches the touch sensor 112 and a swipe performed by the finger when the finger touches the touch sensor 112. In one embodiment, the touch sensor 112 acquires a fingerprint generated by the finger touching the touch sensor 112 and the touch sensing module 110 determines the swipe performed by the finger according to the acquired fingerprint.

Figure 3B:
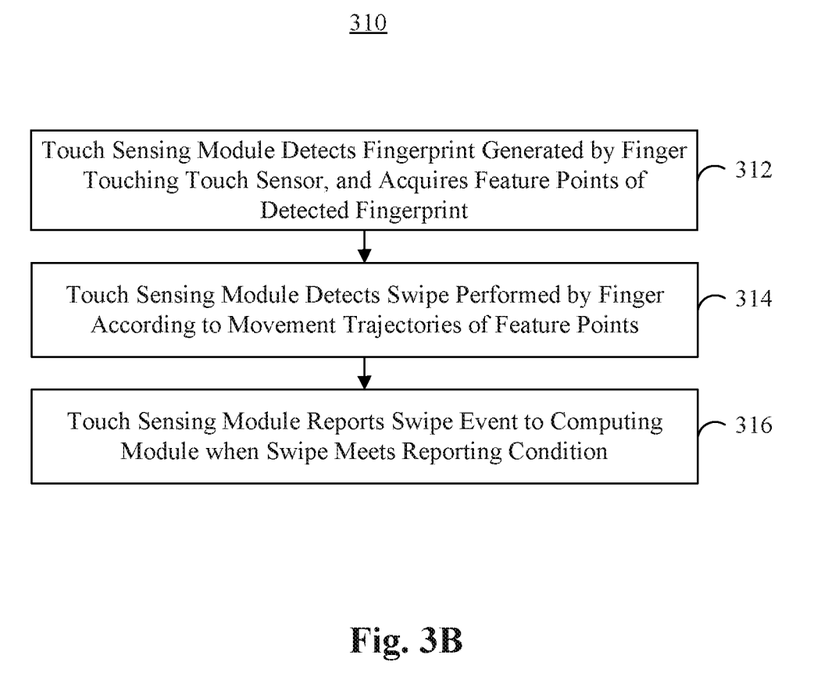
FIG. 3B is a flowchart of a process for reporting a swipe event to a computing module, according to an exemplary embodiment.

FIG. 3B is a flowchart of an implementation of step 310, according to an exemplary embodiment. Referring to FIG. 3B, step 310 further includes the following sub-steps 312-316.

In step 312, the touch sensing module 110 detects a fingerprint generated by the finger touching the touch sensor 112, and acquires feature points of the detected fingerprint.

Consistent with the disclosed embodiments, when the finger touches the touch sensor 112, the fingerprint of the finger is present on a contact surface of the touch sensor 112. The touch sensing module 110 then detects the fingerprint present on the contact surface.

Figure 3C:
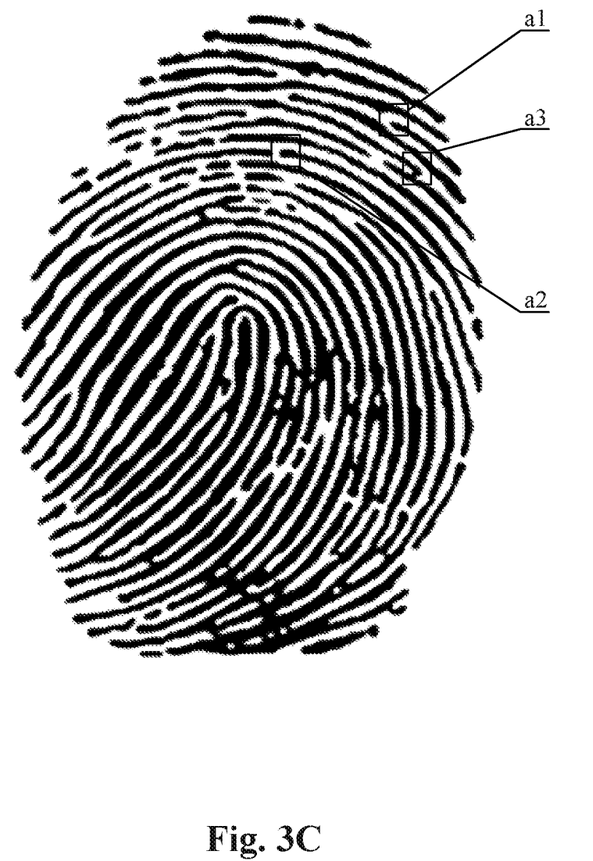
FIG. 3C is a schematic diagram illustrating feature points constituting a fingerprint, according to an exemplary embodiment.

Each fingerprint has its own distinct features. As such, touch sensing module 110 identifies the feature points of the detected fingerprint, so as to track the fingerprint of the same finger and to determine a swipe performed by the finger when the finger continuously touches the touch sensor. FIG. 3C is a schematic diagram illustrating a fingerprint, according to an exemplary embodiment. Referring to FIG. 3C, the fingerprint includes feature points a1, a2, and a3. In particular, feature points a1 and a2 are endpoints of the fingerprint, and feature point a3 is an intersection of the fingerprint.

In one embodiment, relative positions of the feature points in a fingerprint are used to uniquely identify the fingerprint. For example, referring to FIG. 3C, relative positions of every two of feature points a1, a2, and a3 can be used as features for uniquely identifying the fingerprint.

Figure 3D:
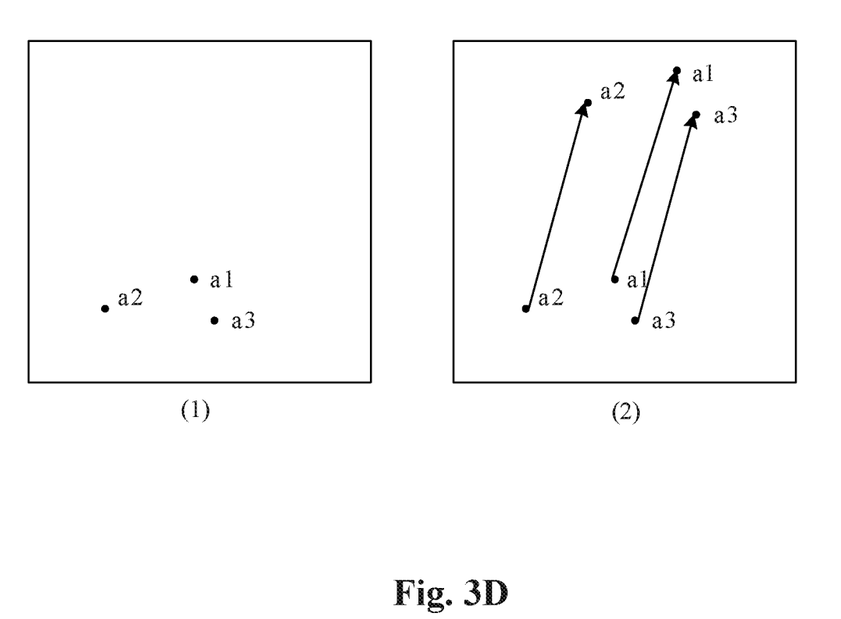
FIG. 3D is a schematic diagram illustrating a movement of a fingerprint, according to an exemplary embodiment.

FIG. 3D is a schematic diagram illustrating a movement of the fingerprint, according to an exemplary embodiment. Referring to Part (1) of FIG. 3D, a process for extract the feature points of the fingerprint is performed to obtain feature points a1, a2, and a3. The feature points of the fingerprint move as the corresponding finger moves. Part (2)

of FIG. 3D illustrates the moved feature points of the fingerprint. As shown by Part (2), movement of the fingerprint or the finger is reflected by the movement of the feature points in the fingerprint or, more particularly, the synchronous movement of the feature points in the fingerprint.

Referring back to FIG. 3B, in step 314, the touch sensing module 110 detects a swipe performed by the finger according to movement trajectories of the feature points.

The touch sensing module 110 detects the swipe according to the movement trajectories of the feature points of the fingerprint. For example, when the feature points move rightwards, the touch sensing module 110 detects a rightward swipe.

In some embodiments, the touch sensing module 110 also determines the swipe performed by the finger based on a combination of the movement velocities and movement trajectories of the feature points. For example, when the movement trajectories of the feature points are rightward and the movement velocities of the feature points are high, the touch sensing module 110 detects a rapid rightward swipe.

In one implementation of the present disclosure, the touch sensing module 110 determines whether a detected movement of a fingerprint is a swipe performed by the corresponding finger, according to certain movement characteristics of the feature points in the fingerprint. The movement characteristics include at least one of movement direction, movement distance, or movement velocity of the feature points. When the movement characteristics of the feature points satisfy predefined movement characteristics associated with certain type of swipe, the touch sensing module 110 determines that the corresponding finger has performed a swipe.

In step 316, the touch sensing module 110 reports a swipe event to the computing module 120 when the swipe meets a reporting condition.

In the disclosed embodiments, step 316 is used to ensure that the detected swipe corresponds to one of preset gestures capable of triggering a response from the smart device 100. As such, the reporting condition includes limitations on the swipe characteristics. For example, the reporting condition specifies that the detected swipe, to be eligible for the reporting, needs to have a distance reaching a preset distance, a velocity higher than a preset velocity, or a movement direction consistent with a preset direction.

Referring back to FIG. 3A, in step 320, the computing module 120 executes an operation corresponding to the swipe event upon receiving the reporting of the swipe event.

When the computing module 120 receives a swipe event, this indicates that a finger performs a swipe that meets the reporting condition. Since a swipe meeting the reporting condition is also a preset swipe capable of triggering a response operation, the computing module 120 executes the response operation upon receiving the swipe event.

The response operation is determined by the application currently operated by the swipe. For example, when a contact list is currently browsed, the response operation may be scrolling the contact list by a preset number of rows. As another example, when an electronic book is currently read, the response operation may be turning the pages of the electronic book.

In one implementation of step 320, the computing module 120 determines the currently operated application and a displayed page, and controls the application to execute a response operation based on the displayed page and the swipe. In another implementation of step 320, the computing module 120 determines the currently operated application and sends the swipe event to the application, such that the application executes the response operation according to the currently displayed page and the swipe.

In step 330, after reporting the swipe event and before detecting that the finger stops touching the touch sensor 112, the touch sensing module 110 reports a gesture-maintaining event to the computing module 120 when detecting that the finger stays at a same contact point on the touch sensor 112 for a preset time duration.

That is, when the finger stops at a contact point after swiping on the touch sensor 112 and stays at the contact point for the preset time duration, the touch sensing module 110 reports the gesture-maintaining event to the computing module 120.

In some embodiments, the touch sensing module 110 detects the time duration for which the finger stays at the same contact point by measuring a time duration for which the contact point is continuously touched by the finger. When the measured time duration reaches the preset time duration, the touch sensing module 110 determines that the time duration for which the finger stays at the contact point reaches the preset time duration.

In step 340, after receiving the reporting of the gesture-maintaining event and before receiving from the touch sensing module 110 a message indicating that the finger leaves the contact point, the computing module 120 executes, at a preset time interval, an operation corresponding to the last swipe event reported by the touch sensing module 110.

Here, the preset time interval may be 0.5 s, 1 s, and the like. Moreover, the preset time interval may be defined by the computing module 120, selected by a user, and/or correspond to the settings of the application that is controlled by the swipe gesture. For example, different applications or different functions of an application may use different preset time intervals. When the computing module 120 determines the application currently being controlled by gestures, the computing module 120 queries a preset time interval associated with the application or a currently used function (e.g., a displayed page) of the application. The computing module 120 then executes, at the preset time interval, the operation corresponding to the last swipe event reported by the touch sensing module 110. The present disclosure does not limit the manner of obtaining or determining the preset time interval.

Figure 3E:
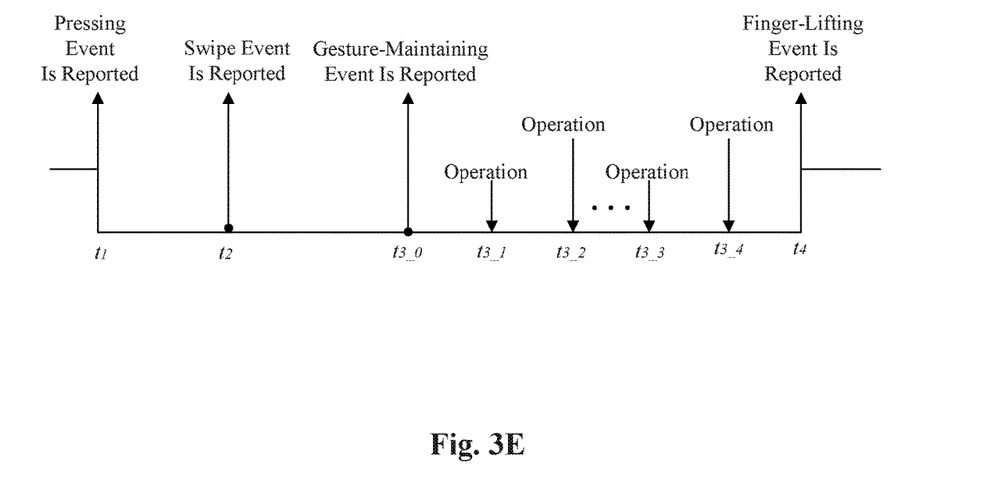
FIG. 3E is a schematic diagram illustrating an implementation of a gesture response method, according to an exemplary embodiment.

The "last swipe event" corresponds to the swipe performed by the finger before the finger stays at the contact point. For example, FIG. 3E is a schematic diagram illustrating an implementation of the gesture response method 300, according to an exemplary embodiment. Referring to FIG. 3E, the finger of the user starts touching the touch sensor 112 at a first point in time $t_1$, at which the touch sensing module 110 detects that the finger presses the touch sensor 112 and reports a pressing event to the computing module 120. The finger then continues to touch and swipe on the touch sensor 112. At a second point in time $t_2$, the touch sensing module 110 determines that a swipe performed by the finger meets a reporting condition, and reports a swipe event to the computing module 120. Next, the finger continues to touch the touch sensor 112 and stays at a contact point on the touch sensor 112. At a third point in time $t_{3\_0}$, the touch sensing module 110 determines the time duration for which the finger stays at the contact point reaches a preset time duration, and thus reports a gesture-maintaining event to the computing module 120. Finally, at a fourth point in time $t_4$, the touch sensing module 110 detects that the finger leaves the touch sensor 112, and reports a finger-lifting event to the computing module 120. Between the third point in time $t_{3\_0}$ and the fourth point in time $t_4$, the computing module 120 repeatedly executes, at a preset time interval, an operation corresponding to the swipe event reported by the touch sensing module at $t_2$. For example, the computing module 120 executes the operation at each of the points in time $t_{3\_0}$, $t_{3\_3}$, and $t_{3\_4}$, which are separated by the preset time interval.

It is noted that the computing module 120 may also execute the operation corresponding to the last swipe event when the preset time interval has passed since the touch sensing module 110 reports the swipe event. That is, the computing module 120 may start to execute the operation when the preset time interval has passed from the time of receiving the reporting of the swipe event, or start to execute the operation when receiving the reporting of the gesture-maintaining event.

In step 340, every time the computing module 120 finishes the execution of the operation, the computing module 120 waits for the preset interval to execute the operation again, until the finger leaves the contact point. The computing module 120 executes the operation in the same manner throughout the repetition.

In step 350, the touch sensing module 110 reports a finger-lifting event to the computing module 120 when the touch sensing module 110 detects that the finger leaves the contact point and does not touch the touch sensor 112 any more.

In some embodiments, the touch sensing module 110 monitors the fingerprint generated by the finger touching on the contact point. When the fingerprint disappears, the touch sensing module 110 determines that the finger leaves the contact point and does not touch the touch sensor any more.

In step 360, after receiving the reporting of the finger-lifting event, the computing module 120 stops executing the operation corresponding to the last swipe event reported by the touch sensing module 110.

In some embodiments, steps 350 360 may be replaced as follows: the touch sensing module 110 reports a finger-lifting event to the computing module 120 when the touch sensing module 110 detects that the finger leaves the contact point; and after the computing module 120 receives the reporting of the finger-lifting event, the computing module 120 stops executing the operation corresponding to the last swipe event reported by the touch sensing module 110. Here, the finger "leaving the contact point" refers to the finger leaving the touch sensor 112 (i.e., does not touch touch sensor 112), or that the finger leaves the contact point and continues swiping on or touching the touch sensor 112.

According to the above-described method 300, since the computing module 120 can continuously and repeatedly execute an operation while a finger touches and stays at a contact point for a prolonged time, gesture control of the smart device 100 is simplified. In particular, the method 300 relieves the use from the tedious operation of repeatedly swiping a finger on the touch sensor 112, when contents displayed by the smart device 110 are needed to be continuously scrolled. As such, the swipe operation of the finger is simplified.

Moreover, consistent with the method 300, the touch sensing module 110 is only required to report the gesture-maintaining event once, to enable the computing module 120 to repeatedly execute the corresponding operation. Therefore, the information transmission between the touch sensing module 110 and the computing module 120 is simplified.

Further, the method 300 uses the touch sensing module 110 to monitor the contact points on the touch sensor 112. When detecting that a contact point is continuously touched for a preset time duration, the touch sensing module 110 determines that a finger has stayed at the contact point for the preset time duration. Thus, the method 300 provides a reliable basis for determining the time duration for which the finger stays at the contact point.

Further, the touch sensing module 110 reports the finger-lifting event to the computing module 120 when detecting that the finger leaves the contact point, such that the computing module 120 can stop executing the corresponding operation. In this manner, the method 300 can automatically stop the repeating of the operation when the finger leaves the contact point.

Further, the touch sensing module 110 monitors the fingerprint generated by the finger touching a contact point, to determine the time when the finger leaves the contact point. Because the finger applies a fingerprint at the contact point when the finger touches the contact point, the disappearance of the fingerprint indicates that the finger leaves, i.e., is removed from, the contact point. This way, the method 300 can accurately determine the time when the finger leaves the contact point.

Next, the device embodiments of the present disclosure are described. The devices are configured to execute the above-described method embodiments. Details undisclosed in the device embodiments can be learned by referring to the above method embodiments.

Figure 4:
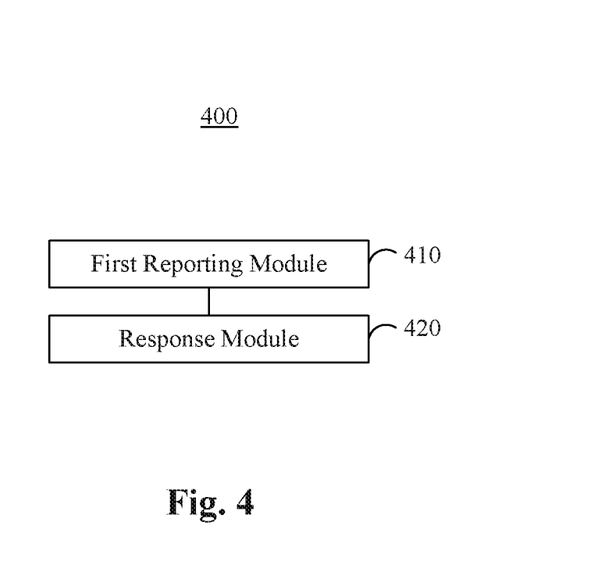
FIG. 4 is a block diagram of a gesture response device, according to an exemplary embodiment.

FIG. 4 is a block diagram of a gesture response device 400, according to an exemplary embodiment. The device 400 may be implemented as a part or the whole of the smart device 100 (FIG. 1). Referring to FIG. 4, the device 400 includes at least a first reporting module 410 and a response module 420.

The first reporting module 410 is configured to control the touch sensing module 110 to report a gesture-maintaining event to the computing module 120 when the touch sensing module 110 detects that a finger swipes on the touch sensor and subsequently stays at a contact point on the touch sensor for a time duration and subsequently stays at a contact point on the touch sensor for a time duration equal to a preset time duration.

The response module 420 is configured to control the computing module 120 to repeatedly execute an operation corresponding to a swipe event reported by the touch sensing module 110, after the computing module 120 receives the reporting of the gesture-maintaining event and before the touch sensing module 110 detects that the finger leaves the contact point. The swipe event corresponds to the finger swiping on the touch sensor before staying at the contact point on the touch sensor.

Figure 5:
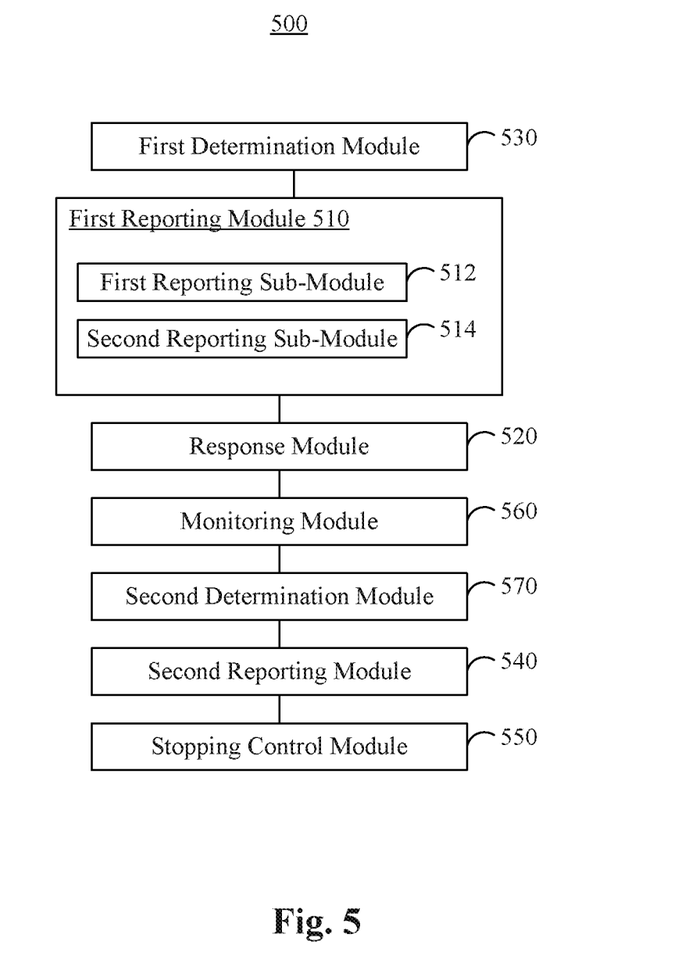
FIG. 5 is a block diagram of a gesture response device, according to an exemplary embodiment.

FIG. 5 is a block diagram of a gesture response device 500, according to another exemplary embodiment. For example, the gesture device 500 may be implemented as a part or the whole of the smart device 100 (FIG. 1). Referring to FIG. 5, the device 500 includes at least a first reporting module 510 and a response module 520, similar to the first reporting module 410 and the response module 420 (FIG. 4), respectively.

In some embodiments, the device 500 further includes a first determination module 530. The first determination module 530 is configured to measure a time duration for which a contact point on the touch sensor 112 is continuously touched when the touch sensing module 110 detects that a finger touches the contact point, and to determine that the time duration for which the finger stays at the contact point reaches the preset time duration when the measured time duration reaches the preset time duration.

In some embodiments, the device 500 further includes a second reporting module 540 and a stopping control module 550.

The second reporting module 540 is configured to control the touch sensing module 110 to report a finger-lifting event to the computing module 120 when the touch sensing module 110 detects that the finger leaves the contact point.

The stopping control module 550 is configured to, after the computing module 120 receives the reporting of the finger-lifting event, control the computing module 120 to stop executing the operation corresponding to the last swipe event reported by the touch sensing module 110.

In some embodiments, the device 500 further includes a monitoring module 560 and a second determination module 570.

The monitoring module 560 is configured to monitor, via the touch sensing module 110, a fingerprint generated by the finger touching the touch sensor 112.

The second determination module 570 is configured to determine that the finger leaves the contact point, when the monitoring module 560 detects that the fingerprint disappears.

In some embodiments, the first reporting module 510 further includes a first reporting sub-module 512 and a second reporting sub-module 514.

The first reporting sub-module 512 is configured to report a swipe event to the computing module 120 after the touch sensing module 110 detects a swipe gesture performed by the finger while the finger touches the touch sensor 112.

As described above, the touch sensor 112 may detect the fingerprint generated by the finger touching the touch sensor 112, and the touch sensing module 110 may determine the swipe of the finger according to the movement of the fingerprint. Accordingly, in one embodiment, the first reporting sub-module 512 is further configured to control the touch sensing module 110 to recognize the fingerprint generated by the finger touching the touch sensor 112 and acquire feature points of the fingerprint of the finger.

The movement trajectories of the feature points of the fingerprint reflect the movement of the finger. Accordingly, in one embodiment, the first reporting sub-module 512 is further configured to control the touch sensing module 110 to detect a swipe performed by the finger according to movement trajectories of the feature points.

As described above, the basis for detecting a swipe performed by the finger is not limited to the feature points' movement trajectories, but also includes information such as the feature points' movement velocities and other movement characteristics (e.g., movement directions, movement distances, etc.). As such, in various embodiments, the first reporting sub-module 512 is further configured to control the touch sensing module 110 to detect a swipe performed by the finger according to the feature points' movement trajectories, movement velocities, other movement characteristics (e.g., movement directions, movement distances, etc.), or a combination thereof.

Moreover, a detected swipe may be reported to the computing module 120 only if the detected swipe meets a reporting condition. As such, in one embodiment, the first reporting sub-module 512 is further configured to control the touch sensing module 110 to report the swipe event to the computing module 120 when the swipe meets a reporting condition.

The second reporting sub-module 514 is configured to control the touch sensing module 110 to report the gesture-maintaining event to the computing module 120 when the touch sensing module 110 detects that the finger stays at the same contact point for the preset time duration after a swipe event.

In some embodiments, the response module 520 is further configured to control the computing module to execute an operation corresponding to a swipe event after the computing module 120 receives a report of the swipe event from the touch sensing module 110. In these embodiments, the operation corresponding to the swipe event is executed with or without the detection of a gesture-maintaining event.

With respect to the devices in the above embodiments, the individual modules' specific manners in performing the respective operations have been described in detail in the embodiments regarding the methods, which will not be elaborated herein.

Figure 6:
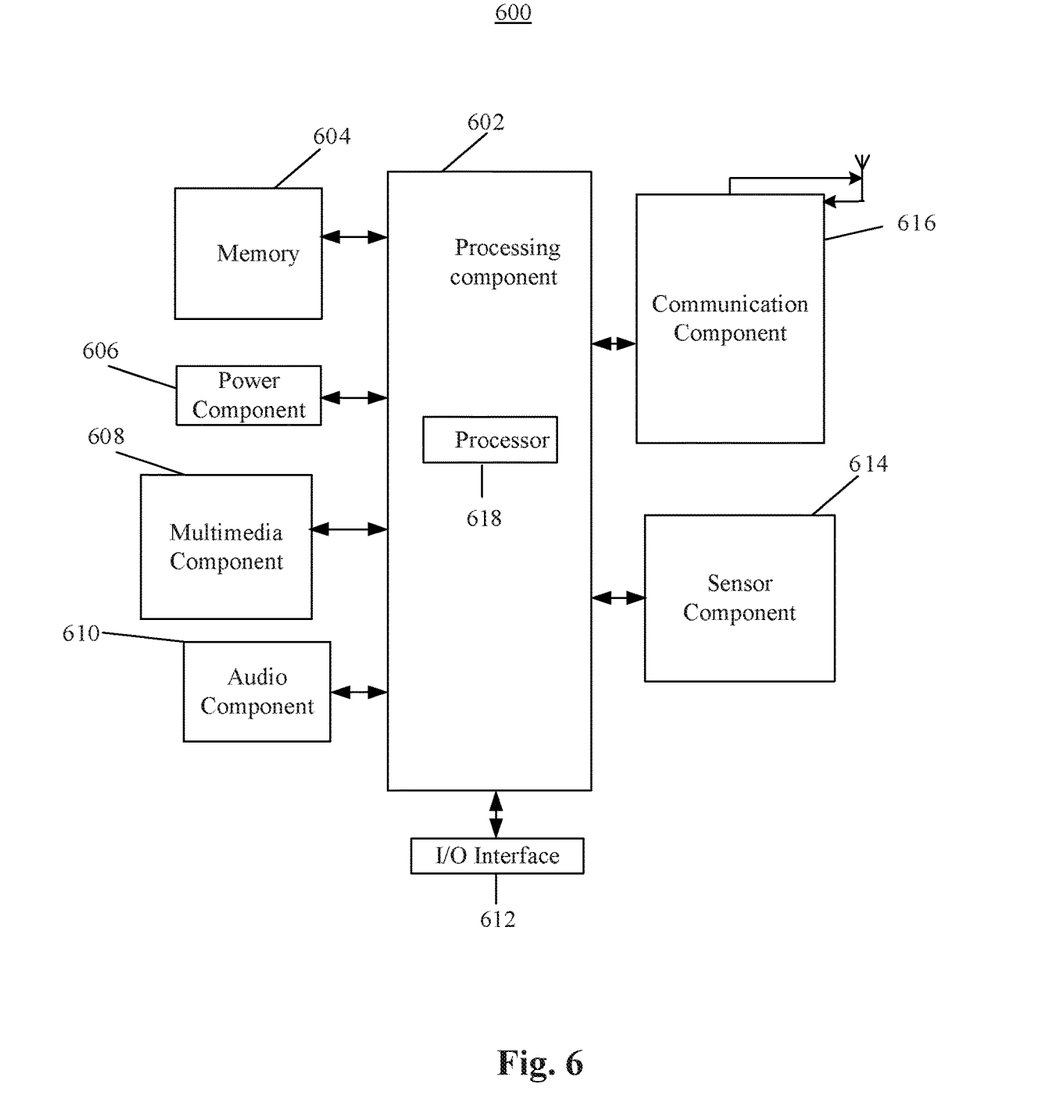
FIG. 6 is a block diagram of a gesture response device, according to an exemplary embodiment.

FIG. 6 is a block diagram of a gesture response device 600, according to an exemplary embodiment. For example, the device 600 may be a smart device including a touch sensing module and a computing module, similar to the touch sensing module 110 and the computing module 120 respectively (FIG. 1). In the disclosed embodiments, the device 600 may be a mobile phone, a computer, a digital broadcast terminal, a messaging device, a gaming console, a tablet, a medical device, exercise equipment, a PDA, etc.

Referring to FIG. 6, the device 600 includes one or more of the following components: a processing component 602, a memory 604, a power component 606, a multimedia component 608, an audio component 610, an input/output (I/O) interface 612, a sensor component 614, and a communication component 616. The computing module 120 may be implemented as a part or the whole of the processing component 602.

The processing component 602 typically controls overall operations of the device 600, such as the operations associated with display, telephone calls, data communications, camera operations, and recording operations. The processing component 602 includes one or more processors 618 to execute instructions to perform all or part of the steps of the above-described methods. Moreover, the processing component 602 includes one or more modules which facilitate interaction between the processing component 602 and other components. For instance, the processing component 602 may include a multimedia module to facilitate interaction between the multimedia component 608 and the processing component 602.

The memory 604 is configured to store various types of data to support the operation of the device 600. Examples of such data include instructions for any applications or methods operated on the device 600, contact data, phonebook data, messages, pictures, video, etc. The memory 604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and a magnetic or optical disk.

The power component 606 provides power for various components of the device 600. The power component 606 includes a power management system, one or more power supplies, and other components associated with the generation, management, and distribution of power in the device 600.

The multimedia component 608 includes a sensor screen providing an output interface between the device 600 and a user. In some embodiments, the sensor screen may include a liquid crystal display and a touch panel. If the sensor screen includes the touch panel, the sensor screen is implemented as a touch sensor to receive an input signal from the user. The touch panel includes one or more touch sensors to sense touches, swipes, and gestures on the touch panel. The touch sensors not only senses a boundary of a touch or swipe action, but also senses a duration and pressure associated with the touch or swipe action. In some embodiments, the multimedia component 608 includes a front camera and/or a rear camera. The front camera and/or the rear camera receive external multimedia data when the device 600 is in an operation mode, such as a photographing mode or a video mode. Each of the front camera and the rear camera may be a fixed optical lens system or have focusing and optical zooming capabilities.

The audio component 610 is configured to output and/or input an audio signal. For example, the audio component 610 includes a microphone configured to receive an external audio signal when the device 600 is in the operation mode, such as a call mode, a recording mode, and a voice recognition mode. The received audio signal may be further stored in the memory 604 or transmitted through the communication component 616. In some embodiments, the audio component 610 further includes a speaker configured to output the audio signal.

The I/O interface 612 provides an interface between the processing component 602 and a peripheral interface module, such as a keyboard, a click wheel, one or more buttons, and the like. The buttons include, but are not limited to: a home button, a volume button, a starting button, and a locking button.

The sensor component 614 includes one or more sensors configured to provide status assessment of various aspects of the device 600. For instance, the sensor component 614 may detect an on/off status of the device 600 and relative positioning of components, e.g., the display and the keyboard, of the device 600, a change in position of the device 600 or a component of the device 600, presence or absence of contact between the user and the device 600, orientation or acceleration/deceleration of the device 600, and a change in temperature of the device 600. The sensor component 614 includes a proximity sensor configured to detect presence of an object nearby without any physical contact. The sensor component 614 may also include a light sensor, such as a complementary metal oxide semiconductor (CMOS) or charge coupled device (CCD) image sensor configured for use in an imaging application. In some embodiments, the sensor component 614 may also include an acceleration sensor, a gyroscope sensor, a magnetic sensor, a pressure sensor, or a temperature sensor. The sensor component 614 further includes a part or the whole of a touch sensing module, similar to the touch sensing module 110. If the sensor component 614 includes a part of the touch sensing module, the other part of the touch sensing module is positioned in the processing component 602.

The communication component 616 is configured to facilitate wired or wireless communication between the device 600 and other devices. The device 600 accesses a wireless network based on a communication standard, such as a wireless fidelity (WiFi), 2G, 3G, 4G, or a combination thereof. In one exemplary embodiment, the communication component 616 receives a broadcast signal or broadcast associated information from an external broadcast management system via a broadcast channel. In one exemplary embodiment, the communication component 616 further includes a near field communication (NFC) module to facilitate short-range communication. For example, the NFC module may be implemented on the basis of a radio frequency identification (RFID) technology, an infrared data association (IrDA) technology, an ultra-wideband (UWB) technology, a Bluetooth (BT) technology, and other technologies.

In exemplary embodiments, the device 600 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above-described gesture response methods.

In exemplary embodiments, there is also provided a non-transitory computer-readable storage medium including instructions, such as included in the memory 604, executable by the processor(s) 618 of the device 600 to implement the above-described gesture response method. For example, the non-transitory computer-readable storage medium may be a ROM, a RAM, a compact disc read-only memory (CD-ROM), a magnetic tape, a floppy disc, an optical data storage device, and the like.

Other embodiments of the present disclosure will be apparent to those skilled in the art from consideration of the specification and practice of the present disclosure. This disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

INDUSTRIAL APPLICABILITY

The present disclosure relates to touch control technology and discloses a gesture response method and device. The gesture response method includes, for example: detecting a swipe event which corresponds to a finger swiping on the touch sensor before stopping at a contact point on the touch sensor; after the swipe event, detecting a time duration for which the finger stays at the contact point; when determining that the time duration reaches a preset time duration, determining a gesture-maintaining event has occurred; and after the gesture-maintaining event is determined and before the finger is detected to leave the contact point, repeatedly executing an operation corresponding to the swipe event at a preset time interval. The disclosed method and device enable a user to continuously scroll contents displayed on a screen without repeatedly swiping a finger on a touch sensor. Accordingly, the disclosed method and device simplify the swipe operation and save the user from the tedious repetition of the same swipe operation.

What is claimed is:

1. A gesture response method performed by an apparatus including a touch sensing device, wherein the touch sensing device further includes a touch sensor, the method comprising:

detecting a swipe event which corresponds to a finger swiping on the touch sensor before stopping at a contact point on the touch sensor;

after the swipe event, detecting a time duration for which the finger stays at the contact point;

when determining that the time duration reaches a preset time duration, determining a gesture-maintaining event has occurred; and after the gesture-maintaining event is determined and before the finger is detected to leave the contact point, repeatedly executing an operation corresponding to the swipe event at a plurality of times separated by a preset time interval, wherein the preset time interval corresponds to a setting of an application that is controlled by the swipe event, and different applications or different functions of an application have different preset time intervals.

2. The method according to claim 1,
wherein the detecting of the time duration for which the finger stays at the contact point further includes:
   detecting the finger touches the contact point after the swipe event; and
   measuring a time duration for which the contact point is continuously touched by the finger; and
wherein determining that the time duration for which the finger stays at the contact point reaches the preset time duration further includes:
   determining that the time duration for which the finger stays at the contact point reaches the preset time duration when the measured time duration reaches the preset time duration.

3. The method according to claim 1, further comprising:
when detecting that the finger leaves the contact point after the occurrence of the gesture-maintaining event, determining a finger-lifting event has occurred; and
upon the determining of the finger-lifting event, stopping the executing of the operation corresponding to the swipe event.

4. The method according to claim 1, wherein detecting that the finger leaves the contact point after the occurrence of the gesture-maintaining event further includes:
   when the finger stays at the contact point, monitoring a fingerprint generated by the finger touching the contact point; and
   determining that the finger leaves the contact point when the fingerprint disappears.

5. The method according to claim 1,
wherein the device further includes a controller coupled with the touch sensing device;
wherein the detecting of the swipe event further includes:
   detecting, by the touch sensing device, the swipe event; and
   reporting, by the touch sensing device, the swipe event to the controller; and
wherein determining that the gesture-maintaining event has occurred further includes:
   after reporting the swipe event and before detecting that the finger stops touching the touch sensor, determining, by the touch-sensing device, whether the finger stays at the contact point for the preset time duration; and
   when the finger is determined to stay at the contact point for the preset time duration, reporting, by the touch sensing device, the gesture-maintaining event to the controller.

6. The method according to claim 2,
wherein the device further includes a controller coupled with the touch sensing device;
wherein the detecting of the swipe event further includes:
   detecting, by the touch sensing device, the swipe event; and
   reporting, by the touch sensing device, the swipe event to the controller; and
wherein determining that the gesture-maintaining event has occurred further includes:
   after reporting the swipe event and before detecting that the finger stops touching the touch sensor, determining, by the touch-sensing device, whether the finger stays at the contact point for the preset time duration; and
   when the finger is determined to stay at the contact point for the preset time duration, reporting, by the touch sensing device, the gesture-maintaining event to the controller.

7. The method according to claim 3,
wherein the device further includes a controller coupled with the touch sensing device;
wherein the detecting of the swipe event further includes:
   detecting, by the touch sensing device, the swipe event; and
   reporting, by the touch sensing device, the swipe event to the controller; and
wherein determining that the gesture-maintaining event has occurred further includes:
   after reporting the swipe event and before detecting that the finger stops touching the touch sensor, determining, by the touch-sensing device, whether the finger stays at the contact point for the preset time duration; and
   when the finger is determined to stay at the contact point for the preset time duration, reporting, by the touch sensing device, the gesture-maintaining event to the controller.

8. The method according to claim 4,
wherein the device further includes a controller coupled with the touch sensing device;
wherein the detecting of the swipe event further includes:
   detecting, by the touch sensing device, the swipe event; and
   reporting, by the touch sensing device, the swipe event to the controller; and
wherein determining that the gesture-maintaining event has occurred further includes:
   after reporting the swipe event and before detecting that the finger stops touching the touch sensor, determining, by the touch-sensing device, whether the finger stays at the contact point for the preset time duration; and
   when the finger is determined to stay at the contact point for the preset time duration, reporting, by the touch sensing device, the gesture-maintaining event to the controller.

9. The method according to claim 5, further comprising:
executing, by the controller, the operation corresponding to the swipe event after receiving the reporting of the swipe event.

10. The method according to claim 6, further comprising:
executing, by the controller, the operation corresponding to the swipe event after receiving the reporting of the swipe event.

11. The method according to claim 7, further comprising:
executing, by the controller, the operation corresponding to the swipe event after receiving the reporting of the swipe event.

12. The method according to claim 8, further comprising:
executing, by the controller, the operation corresponding to the swipe event after receiving the reporting of the swipe event.

13. An apparatus, comprising:
a touch sensing device including a touch sensor; and
a controller coupled with the touch sensing device, the controller including:
  a processor; and
  a memory for storing instructions executable by the processor;
wherein the touch sensing device is configured to:
  when detecting that a finger swipes on the touch sensor and then stays at a contact point on the touch sensor for a time duration equal to a preset time duration, report a gesture-maintaining event to the controller; and
wherein the processor is configured to:
  after receiving the reporting of the gesture-maintaining event from the touch sensing device and before receiving from the touch sensing device a message indicating that the finger leaves the contact point, execute, at a plurality of times separated by a preset time interval, an operation corresponding to a last swipe event reported by the touch sensing device, the last swipe event corresponding to the finger swiping on the touch sensor before stopping at the contact point,
wherein the preset time interval corresponds to a setting of an application that is controlled by the swipe event, and different applications or different functions of an application have different preset time intervals.

14. The apparatus according to claim 13, wherein the touch sensing device is further configured to:
  detect the finger touches the contact point after the last swipe event; and
  measure a time duration for which the contact point is continuously touched by the finger; and
  determine that the time duration for which the finger stays at the contact point reaches the preset time duration when the measured time duration reaches the preset time duration.

15. The apparatus according to claim 13, wherein:
the touch sensing device is further configured to:
  upon detecting that the finger leaves the contact point after the occurrence of the gesture-maintaining event, report a finger-lifting event to the processor; and the processor is further configured to:
  upon receiving the reporting of the finger-lifting event, stop executing the operation corresponding to the last swipe event.

16. The apparatus according to claim 13, wherein the touch sensing device is further configured to:
  when the finger stays at the contact point, monitor a fingerprint generated by the finger touching the contact point; and
  determine that the finger leaves the contact point when the fingerprint disappears.

17. The apparatus according to claim 13, wherein the touch sensing device is further configured to:
  detect the last swipe event;
  report the last swipe event to the controller;
  after reporting the last swipe event to the processor and before detecting that the finger stops touching the touch sensor, determine whether the finger stays at the contact point for the preset time duration; and
  when the finger is determined to stay at the contact point for the preset time duration, report the gesture-maintaining event to the controller.

18. The apparatus according to claim 17, wherein the processor is further configured to:
  after receiving the reporting of the last swipe event from the touch sensing device, execute an operation corresponding to the last swipe event.

19. A non-transitory computer-readable storage medium comprising instructions that, when executed by a processor of a terminal device, cause the processor to perform a gesture response method, the method comprising:
  detecting a swipe event which corresponds to a finger swiping on a touch sensor of the terminal device before stopping at a contact point on the touch sensor;
  after the swipe event, detecting a time duration for which the finger stays at the contact point;
  when determining that the time duration reaches a preset time duration, determining a gesture-maintaining event has occurred; and
  after the gesture-maintaining event is determined and before the finger is detected to leave the contact point, repeatedly executing an operation corresponding to the swipe event at a plurality of times separated by a preset time interval,
wherein the preset time interval corresponds to a setting of an application that is controlled by the swipe event, and different applications or different functions of an application have different preset time intervals.

20. The method according to claim 1, wherein the touch sensor is a fingerprint acquirer located on a back of the apparatus.

* * * * *